(12) United States Patent
Novak

(10) Patent No.: US 7,111,320 B1
(45) Date of Patent: Sep. 19, 2006

(54) SYSTEM AND METHOD FOR PERSONALIZED REMOTE CONTROL OF AN INTERACTIVE TELEVISION SYSTEM

(75) Inventor: Robert E. Novak, Kirkland, WA (US)

(73) Assignee: Digeo, Inc., Kirkland, WA (US)

( * ) Notice: Subject to any disclaimer, the term of this patent is extended or adjusted under 35 U.S.C. 154(b) by 1009 days.

(21) Appl. No.: 09/962,926

(22) Filed: Sep. 25, 2001

Related U.S. Application Data

(60) Provisional application No. 60/283,574, filed on Apr. 13, 2001.

(51) Int. Cl.
H04N 7/16 (2006.01)

(52) U.S. Cl. ...................... 725/139; 348/734

(58) Field of Classification Search ............... 725/139, 725/140, 141, 131, 10, 11, 112; 340/734, 340/825.73, 825; 348/734
See application file for complete search history.

(56) References Cited

U.S. PATENT DOCUMENTS

| | | | |
|---|---|---|---|
| 5,444,499 A | 8/1995 | Saitoh | 348/734 |
| 5,650,831 A * | 7/1997 | Farwell | 348/734 |
| 5,663,756 A * | 9/1997 | Blahut et al. | 725/30 |
| 5,715,020 A | 2/1998 | Kuroiwa et al. | 348/734 |
| 5,898,397 A * | 4/1999 | Murray | 341/176 |
| 5,900,867 A | 5/1999 | Schindler et al. | 345/327 |
| 6,104,334 A * | 8/2000 | Allport | 341/175 |
| 6,240,181 B1 * | 5/2001 | Tunstall | 379/428.01 |
| 6,359,661 B1 * | 3/2002 | Nickum | 348/734 |
| 6,583,825 B1 * | 6/2003 | Yuen et al. | 348/731 |

* cited by examiner

Primary Examiner—Christopher Grant
Assistant Examiner—Sumaiya A. Chowdhury
(74) Attorney, Agent, or Firm—Kory D. Christensen; Stoel Rives, LLP

(57) ABSTRACT

An interactive television system for providing personalized remote control is disclosed. Each user or remote control of the interactive television system may be associated with a different control-to-function map. The control-to-function maps may be personalized for each remote control or user.

44 Claims, 13 Drawing Sheets

SYSTEM AND METHOD FOR PERSONALIZED REMOTE CONTROL OF AN INTERACTIVE TELEVISION SYSTEM

RELATED APPLICATIONS

The present application is related to and claims priority from U.S. Provisional Application No. 60/283,574, entitled "Personalized Remote Control," filed Apr. 13, 2001, with inventor Robert E. Novak, which is hereby incorporated by reference in its entirety.

BACKGROUND

1. Field of the Invention

The present invention relates generally to the field of interactive television systems. More specifically, the present invention relates to a system and method for personalized remote control of an interactive television system.

2. Description of Related Background Art

Interactive television (ITV) systems are steadily growing in popularity. However, as users demand additional features, ITV systems are also increasing in complexity. As a result, remote controls used with these systems are likewise becoming increasingly complex. For example, a standard ITV remote control may include fifty or more individual buttons or controls.

Typically, a remote control for an ITV system includes many buttons that a consumer never or rarely uses. The inclusion of such buttons increases the overall complexity of the remote control and decreases its usability.

In general, consumers use only a subset of the buttons on a remote control. Moreover, different consumers use different subsets. For example, one person may enjoy surfing the Web, while another person may enjoy channel surfing. In each case, the unused buttons are distracting, cumbersome, and diminish the usability of the remote control.

Accordingly, it would be an advancement in the art to reduce the number of buttons on a remote control, without limiting the remote control's functionality. It would also be an advancement in the art to provide users with separate, personalized remote controls, each of which may be configured to perform different functions for each button. Similarly, it would be an advancement in the art to provide a single remote control, which may be easily reconfigured to perform different functions depending on the currently-active user.

BRIEF DESCRIPTION OF THE DRAWINGS

Non-exhaustive embodiments of the invention are described with reference to the figures, in which.

DETAILED DESCRIPTION OF THE PREFERRED EMBODIMENTS

Figure 1:
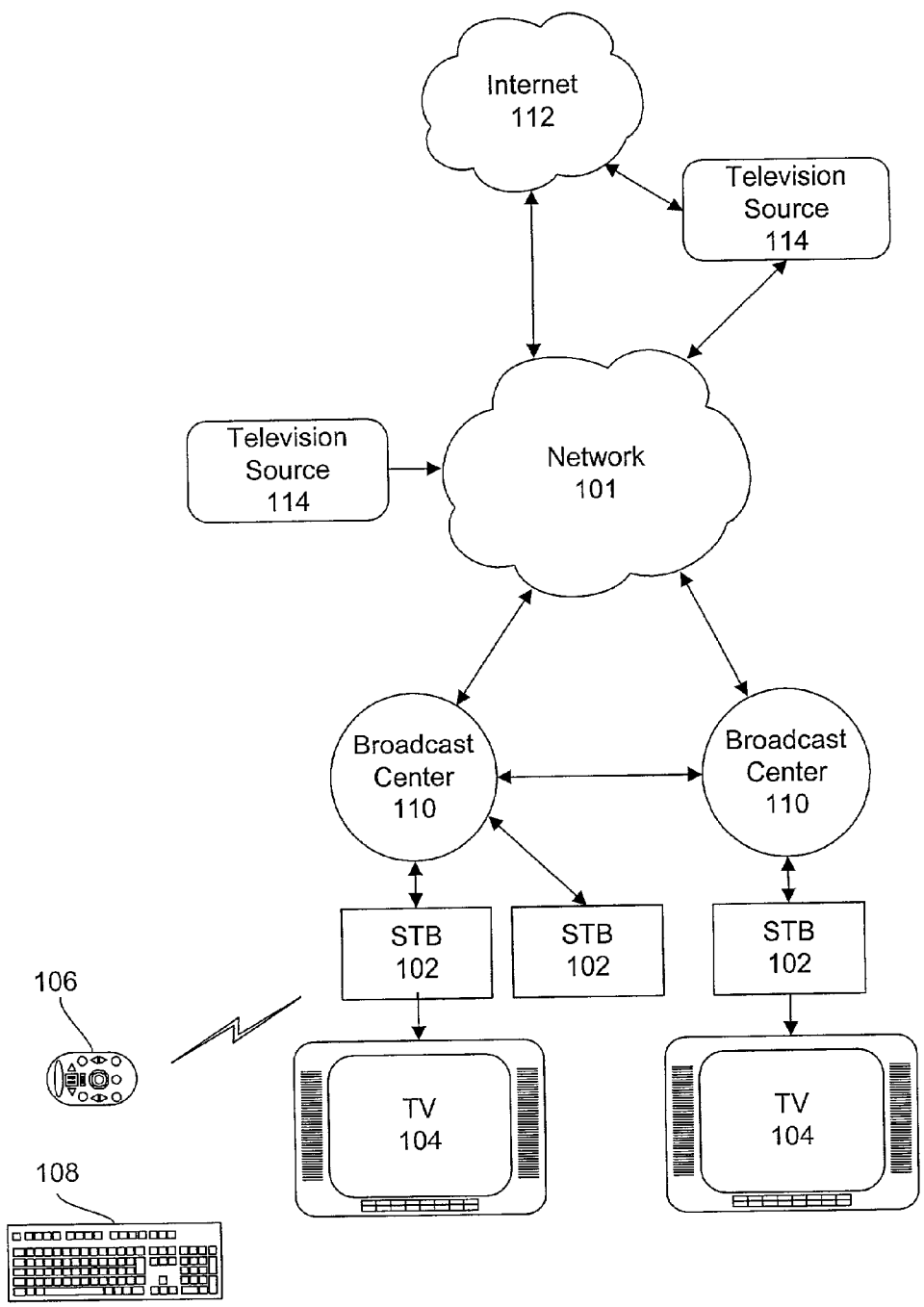
FIG. 1 is a block diagram of a communication system.

The present invention solves the foregoing problems and disadvantages by providing a system and method for personalized remote control of an ITV system.

In one embodiment, an ITV system includes a plurality of remote controls for use by different household members. As described in greater detail below, the remote controls may be personalized, such that the ITV system may perform various user-specified functions for each button thereon. Accordingly, a remote control in accordance with the present invention may include fewer buttons than a conventional ITV remote control.

When a button is pressed, the remote control transmits a first code sequence distinguishing the remote control from other remote controls associated with the ITV system. The remote control also transmits second code sequence identifying the pressed button. Each code sequence may include one or more discrete codes using any conventional wireless encoding format, e.g., IrDA.

In one embodiment, the ITV system includes a remote-specific button-to-function map for each of the plurality of remote controls. A remote-specific button-to-function map associates a button on a remote control (e.g., a code sequence generated in response to the button) with a function to be performed by the ITV system when the button is pressed (e.g., change channels, adjust volume, display an EPG listing).

Based on the first code sequence, the ITV system identifies a remote-specific button-to-function map corresponding to the remote control. Thereafter, based on the second code sequence, the ITV system identifies and executes a function specified within the identified button-to-function map.

In an alternative configuration, an ITV system may include a single remote control that is shared by multiple users. The ITV system may store a different user-specific button-to-function map for each user.

An "active" user may be selected by sending a first code sequence from the remote control to the ITV system. The first code sequence may be sent in response to the user pressing a specifically-designated button (e.g., a user button) or in response to an on-screen menu selection or the like. Based on the active user, a particular user-specific button-to-function map is identified.

Thereafter, when the user presses a button on the remote control, a second code sequence is transmitted to the ITV system identifying the pressed button. Using the second code sequence with the identified button-to-function map, a function to be performed by the ITV system is identified and executed.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, user selections, network transactions, database queries, database structures, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Referring now to FIG. 1, there is shown a communication system 100. In one implementation, the system 100 relies on a broadband network 101 for communication, such as a cable television network or a direct satellite broadcast (DBS) network, although other networks are possible.

The system 100 may include a plurality of set top boxes (STBs) 102 located, for instance, at customer homes or offices. Generally, an STB 102 is a consumer electronics device that serves as a gateway between a customer's television 104 and the network 101. In alternative embodiments, an STB 102 may be embodied more generally as a personal computer (PC), an advanced television 104 with STB functionality, or another type of client terminal.

An STB 102 receives encoded television signals and other information from the network 101 and decodes the same for display on the television 104 or other display device, such as a computer monitor. As its name implies, an STB 102 is typically located on top of, or in close proximity to, the television 104.

Each STB 102 may be distinguished from other network components by a unique identifier, number, code, or address, examples of which include an Internet Protocol (IP) address (e.g., an IPv6 address), a Media Access Control (MAC) address, or the like. Thus, video streams and other information may be transmitted from the network 101 to a specific STB 102 by specifying the corresponding address, after which the network 101 routes the transmission to its destination using conventional techniques.

A remote control 106 is provided, in one configuration, for convenient remote operation of the STB 102 and the television 104. The remote control 106 may use infrared (IR), radio frequency (RF), or other wireless technologies to transmit control signals to the STB 102 and the television 104.

Additionally, a keyboard 108 (either wireless or wired) is provided, in one embodiment, to allow a user to rapidly enter text information into the STB 102. Such text information may be used for e-mail, instant messaging (e.g. text-based chat), or the like. In various embodiments, the keyboard 108 may use IR, RF, or other wireless technologies to transmit keystroke data to the STB 102.

Each STB 102 may be coupled to the network 101 via a broadcast center 110. In the context of a cable network, a broadcast center 110 may be embodied as a "head-end", which is generally a centrally-located facility within a community where television programming is received from a local cable TV satellite downlink or other source and packaged together for transmission to customer homes. In one configuration, a head-end also functions as a Central Office (CO) in the telecommunication industry, routing video streams and other data to and from the various STBs 102 serviced thereby.

A broadcast center 110 may also be embodied as a satellite broadcast center within a direct broadcast satellite (DBS) system. A DBS system may utilize a small 18-inch satellite dish, which is an antenna for receiving a satellite broadcast signal. Each STB 102 may be integrated with a digital integrated receiver/decoder (IRD), which separates each channel, and decompresses and translates the digital signal from the satellite dish to be displayed by the television 104.

Programming for a DBS system may be distributed, for example, by multiple high-power satellites in geosynchronous orbit, each with multiple transponders. Compression (e.g., MPEG) may be used to increase the amount of programming that can be transmitted in the available bandwidth.

The broadcast centers 110 may be used to gather programming content, ensure its digital quality, and uplink the signal to the satellites. Programming may be received by the broadcast centers 110 from content providers (CNN®, ESPN®, HBO®, TBS®, etc.) via satellite, fiber optic cable and/or special digital tape. Satellite-delivered programming is typically immediately digitized, encrypted and uplinked to the orbiting satellites. The satellites retransmit the signal back down to every earth-station, e.g., every compatible DBS system receiver dish at customers' homes and businesses.

Some broadcast programs may be recorded on digital videotape in the broadcast center 110 to be broadcast later. Before any recorded programs are viewed by customers, technicians may use post-production equipment to view and analyze each tape to ensure audio and video quality. Tapes may then be loaded into a robotic tape handling systems, and playback may be triggered by a computerized signal sent from a broadcast automation system. Back-up videotape playback equipment may ensure uninterrupted transmission at all times.

Regardless of the nature of the network 101, the broadcast centers 110 may be coupled directly to one another or through the network 101. In alternative embodiments, broadcast centers 110 may be connected via a separate network, one particular example of which is the Internet 112. The Internet 112 is a "network of networks" and is well known to those skilled in the art. Communication over the Internet 112 is accomplished using standard protocols, such as TCP/IP (Transmission Control Protocol/Internet Protocol) and the like.

A broadcast center 110 may receive television programming for distribution to the STBs 102 from one or more television programming sources 114 coupled to the network 101. Preferably, television programs are distributed in an encoded format, such as MPEG (Moving Picture Experts Group). Various MPEG standards are known, such as MPEG-2, MPEG-4, MPEG-7, and the like. Thus, the term "MPEG," as used herein, contemplates all MPEG standards. Moreover, other video encoding/compression standards exist other than MPEG, such as JPEG, JPEG-LS, H.261, and H.263. Accordingly, the invention should not be construed as being limited only to MPEG.

Of course, the communication system 100 illustrated in FIG. 1 is merely exemplary, and other types of devices and networks may be used within the scope of the invention.

Figure 2:
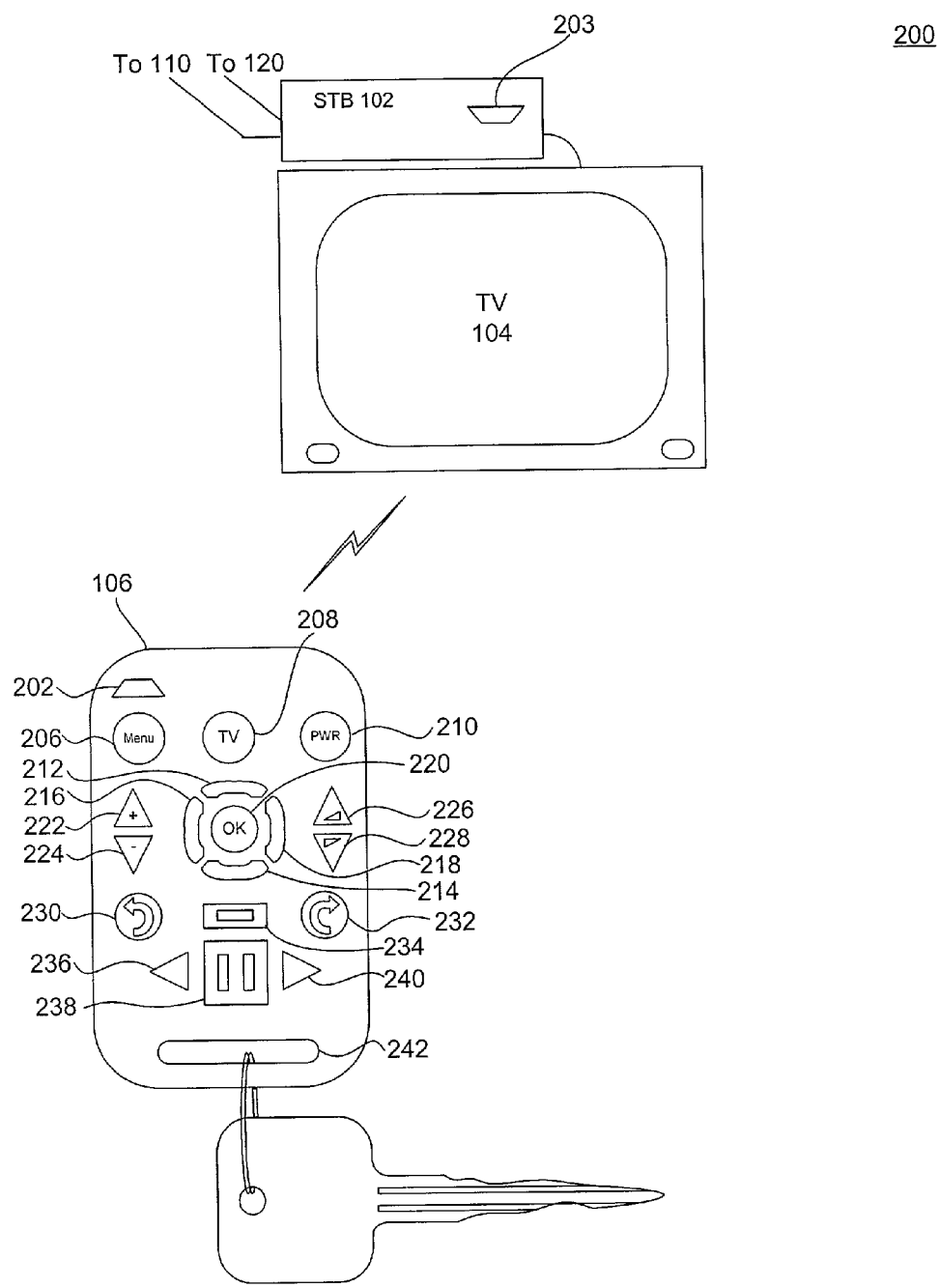
FIG. 2 is an illustration of an interactive television (ITV) system with a personalized remote control.

Referring now to FIG. 2, there is shown an interactive television (ITV) system 200 according to an embodiment of the invention. As depicted, the ITV system 200 may include an STB 102, a television 104 (or other display device), a remote control 106, and, in certain configurations, a keyboard 108.

The remote control 106 is provided for convenient remote operation of the STB 102 and the television 104. In one configuration, the remote control 106 includes a wireless transmitter 202 for transmitting control signals to a wireless receiver 203 within the STB 102 and/or the television 104. The wireless transmitter 202 and the wireless receiver 203 may use IR, RF, or other standard wireless technologies.

The remote control 106 may include a number of buttons or other controls. For instance, the remote control 106 may include a menu button 206, a "Return to TV" button 208 for removing any interactive displays from the screen, a power button 210, an up arrow button 212, a down arrow button 214, a left arrow button 216, a right arrow button 218, an "OK" button 220, a channel up button 222, a channel down button 224, a volume up button 226, a volume down button 228, a rewind/replay button 230 for rewinding any type of media (e.g., a video or a digitally recorded program) a fixed number of seconds, a skip forward button 232 for fast forwarding ahead in any type of media a fixed number of seconds (e.g., 30 seconds), a stop button 234, a rewind button 236, a pause button 238, and a fast forward button 240.

As described in greater detail hereafter, the functions performed by the above-described buttons are not fixed, but may be reconfigured by a user. For example, the channel up/down buttons 222, 224 may be configured to adjust the volume, etc.

Of course, the remote control 106 may include other controls, such as alphanumeric buttons (not shown), and the like. In addition, the remote control 106 may be configured to transmit codes for opening a garage door and/or unlocking an automobile door in response to activation of a button thereon. In such embodiments, the remote control 106 may be programmable or programmed with appropriate codes for initiating these functions. Devices for opening garage doors and/or unlocking automobile door are known in the art. However, no ITV-based remote controls 106 include such functionality. In one embodiment, the remote control 106 may include a radio frequency (RF) transmitter 202 (if not already included) to transmit appropriate codes to a garage door opener and/or car door locking mechanism.

Unlike conventional ITV remotes, which may include fifty or more individual buttons, the depicted remote control 106 includes only eighteen buttons. This allows the remote control 106 to be smaller in size than standard ITV remotes.

In one embodiment, the smaller size allows the remote control 106 to be configured as a key chain. For example, as shown in FIG. 2, the remote control 106 may include a key chain attachment 242 for coupling the remote control 106 to a set of keys.

Figure 3:
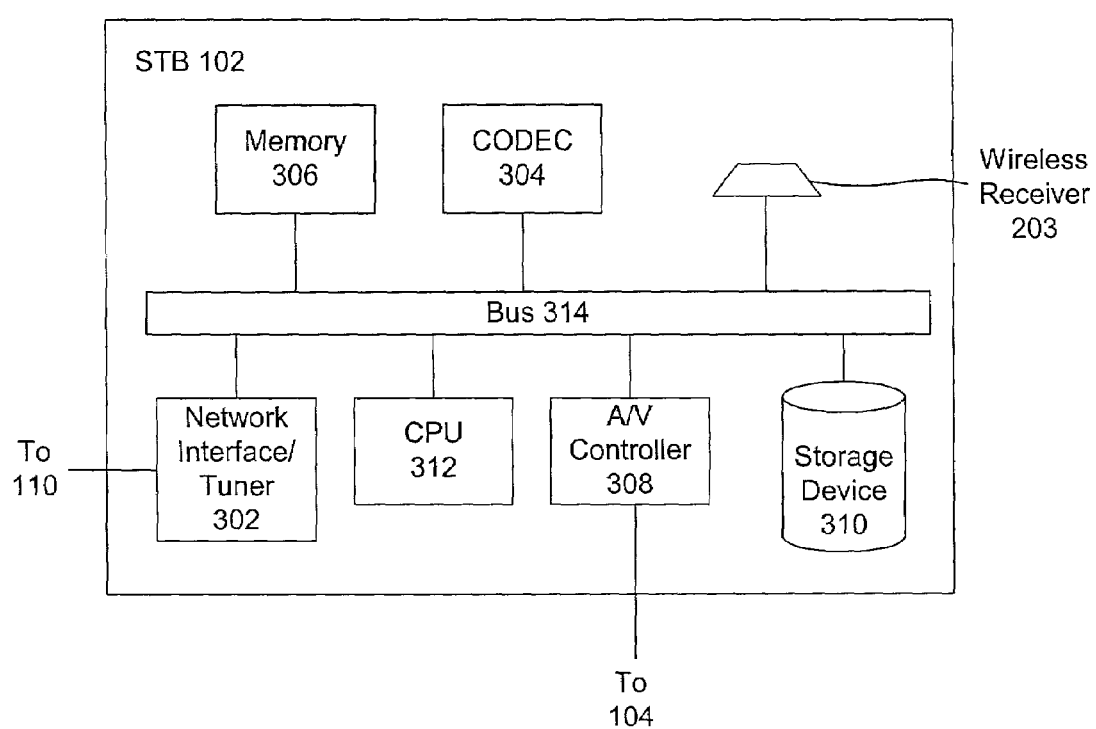
FIG. 3 is a block diagram of physical components of a set top box (STB)

Referring now to FIG. 3, there is shown a block diagram of physical components of an STB 102 according to an embodiment of the invention. As noted above, the STB 102 includes a wireless receiver 203 for receiving control signals sent by the wireless transmitter 202 in the remote control 106.

The STB 102 also includes, in one implementation, a network interface/tuner 302 for receiving television signals and other data from the network 101 via a broadcast center 110. The interface/tuner 302 may include conventional tuning circuitry for receiving, demodulating, and demultiplexing MPEG-encoded television signals, e.g., digital cable or satellite TV. In certain embodiments, the interface/tuner 302 may include analog tuning circuitry for tuning to analog television signals, e.g., analog cable TV.

The interface/tuner 302 may also include conventional modem circuitry for sending or receiving data. For example, the interface/tuner 302 may conform to the DOCSIS (Data Over Cable Service Interface Specification) or DAVIC (Digital Audio-Visual Council) cable modem standards. Of course, the network interface and tuning functions could be performed by separate components within the scope of the invention.

In one configuration, one or more frequency bands (for example, from 5 to 30 MHz) may be reserved for upstream transmission. Digital modulation (for example, quadrature amplitude modulation or vestigial sideband modulation) may be used to send digital signals in the upstream transmission. Of course, upstream transmission may be accomplished differently for different networks 101. Alternative ways to accomplish upstream transmission include using a back channel transmission, which is typically sent via an analog telephone line, ISDN, DSL, or other techniques.

The STB 102 may also include a codec 304, which serves to encode/decode audio/video signals sent to, or received from, the network 101. The codec 304 may be implemented in hardware and/or software. Moreover, the codec 304 may use various algorithms, such as MPEG or Voice over IP (VoIP), for encoding and decoding.

The STB 102 further includes a memory device 306, such as a random access memory (RAM), for storing temporary data. Similarly, a read-only memory (ROM) may be provided for storing more permanent data, such as fixed code and configuration information.

In one embodiment, an audio/video (A/V) controller 308 is provided for converting digital audio/video signals into analog signals for playback/display on the television 104. The A/V controller 308 may be implemented using one or more physical devices, such as separate graphics and sound controllers. The A/V controller 308 may include graphics hardware for performing bit-block transfers (bit-blits) and other graphical operations for displaying a graphical user interface (GUI) on the television 104.

In some implementations, the STB 102 may include a storage device 310, such as a hard disk drive or the like. The storage device 310 may be configured to store encoded television broadcasts and retrieve the same at a later time for display. The storage device 310 may be configured, in one embodiment, as a personal video recorder (PVR), enabling scheduled recording of television programs, pausing (buffering) of live video, etc. The storage device 310 may also be used in various embodiments to store viewer preferences, parental lock settings, electronic program guide (EPG) data, passwords, e-mail messages, and the like. In one implementation, the storage device 310 also stores an operating system (OS) for the STB 102, such as Windows CE® or Linux®.

A CPU 312 controls the operation of the STB 102, including the other components thereof, which are coupled to the CPU 312 in one embodiment via a bus 314. The CPU 312 may be embodied as a microprocessor, a microcontroller, a digital signal processor (DSP) or other device known in the art. For instance, the CPU 312 may be embodied as an Intel® x86 processor. As noted above, the CPU 312 may perform logical and arithmetic operations based on program code stored within the memory 306 or the storage device 310.

Of course, FIG. 3 illustrates only one possible configuration of an STB 102. Those skilled in the art will recognize that various other architectures and components may be provided within the scope of the invention. In addition, various standard components are not illustrated in order to avoid obscuring aspects of the invention.

Figure 4:
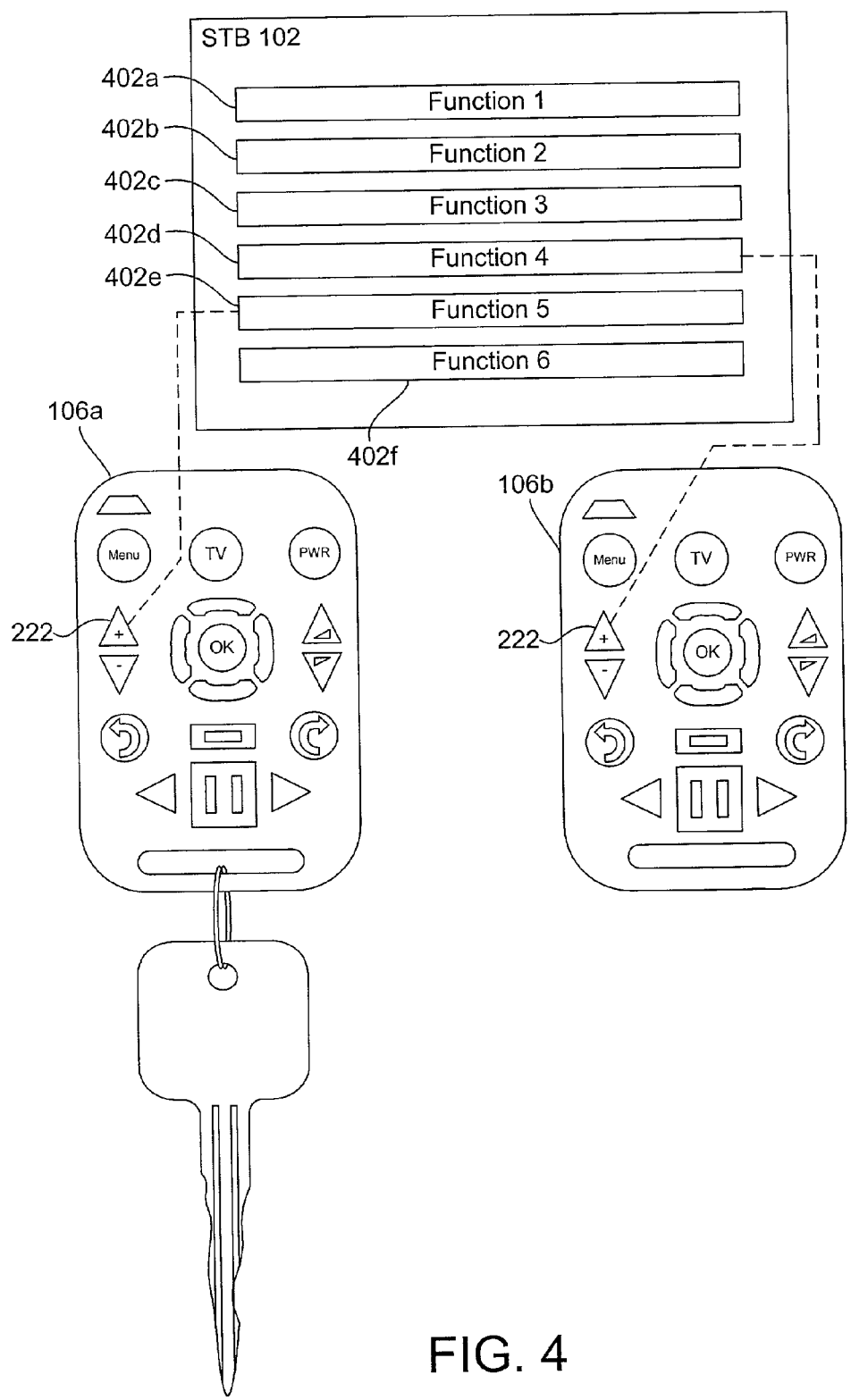
FIG. 4 is a block diagram illustrating correspondence between buttons on a remote control and functions performed by an STB.

FIG. 4. illustrates an embodiment of the invention in which an STB 102 includes two separate remote controls 106a–b. Of course, those skilled in the art will recognize that more than two remote controls 106 may be associated with a single STB 102.

As noted above, the STB 102 may perform various functions 402 in response to activation of a button on one of the remote controls 106. Exemplary functions 402 may include changing the channel, adjusting the volume, making a menu selection, etc.

In one implementation, activation of the same physical button on different remote controls 106 may activate different functions 402 within the STB 102. For example, activation of the channel up button 222 on one remote control 106a may cause the STB 102 to perform a first function 402e, while activation of the same button 222 on a different remote control 106b may cause the STB 102 to perform a second function 402d. As will be explained in greater detail below, a user may assign a button on a particular remote control 106 to a particular function 402 within the STB 102. Of course, the number of functions 402 that may be performed by the STB 102 may be greater than the number of buttons on a remote control 106.

Figure 5:
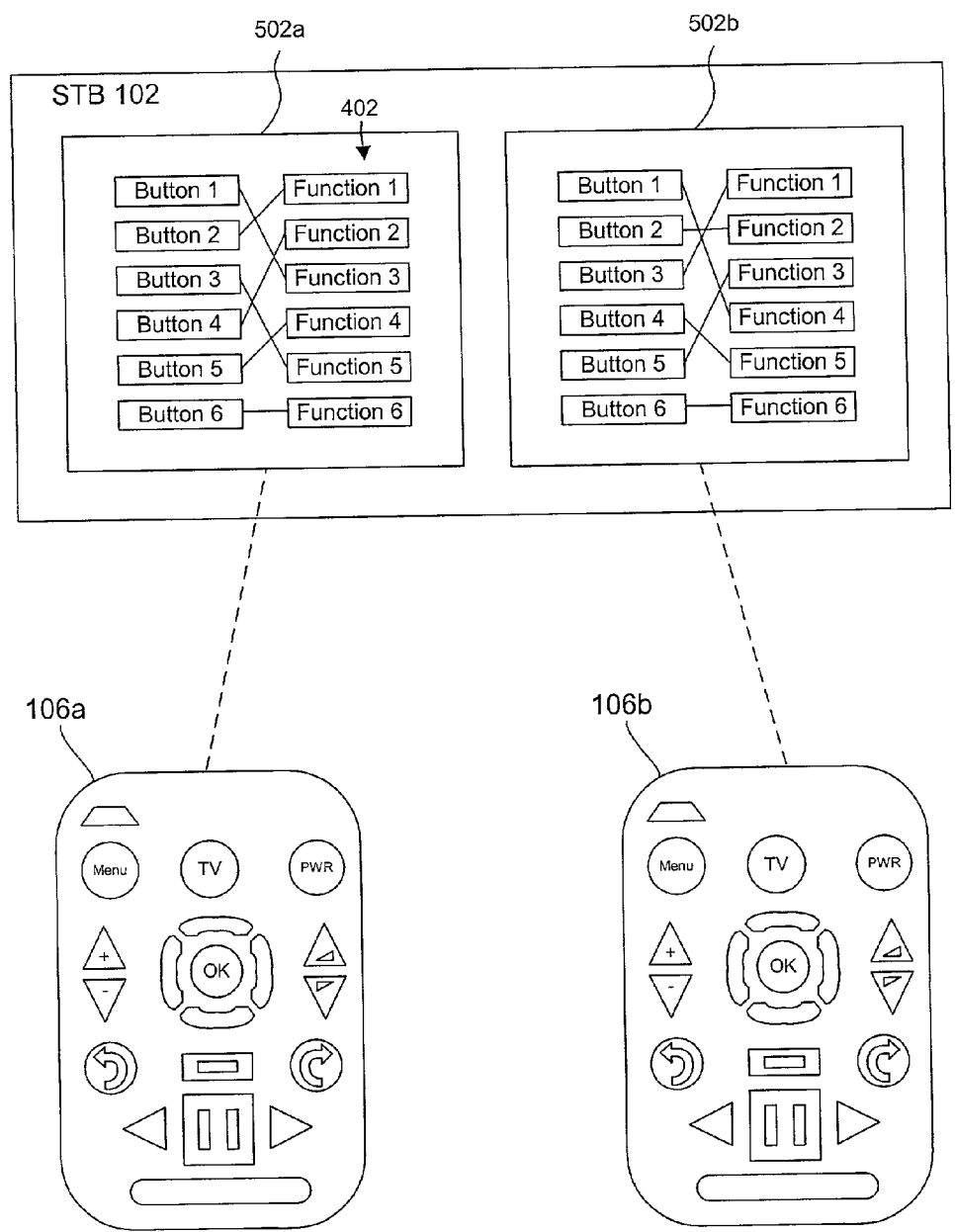
FIG. 5 is a block diagram illustrating correspondence between remote-specific button-to-function maps within an STB and separate remote controls.

To accomplish the foregoing, as illustrated in FIG. 5, the STB 102 may store a different button-to-function map 502a–b (or, stated more broadly, a control-to-function map) for each remote control 106a–b. A button-to-function map 502 associates at least one button on a corresponding remote control 106 with a function to be performed by the STB 102 in response to activation of that button. Of course, a button-to-function map 502 may be embodied using any suitable data structure, such as a lookup table, linked list, database, etc.

In one embodiment, a button-to-function map 502 associates an indication of a button with an indication of a function to be performed. The indication of the button may be embodied as a code sequence generated by the remote control 106 in response to the button being pressed. The code sequence may include one or more discrete codes, symbols, or numbers, in any suitable encoding format. For example, the code sequence may include one or more standard IrDA (Infrared Data Association) codes. The indication of the function to be performed may be embodied as a function name, pointer, base address, or other suitable indication of a function.

As shown in FIG. 5, the remote control 106a has an associated button-to-function map 502a, while the remote control 106b has an associated button-to-function map 506b. Thus, the illustrated button-to-function maps 502a–b may be described as "remote-specific."

Figure 6:
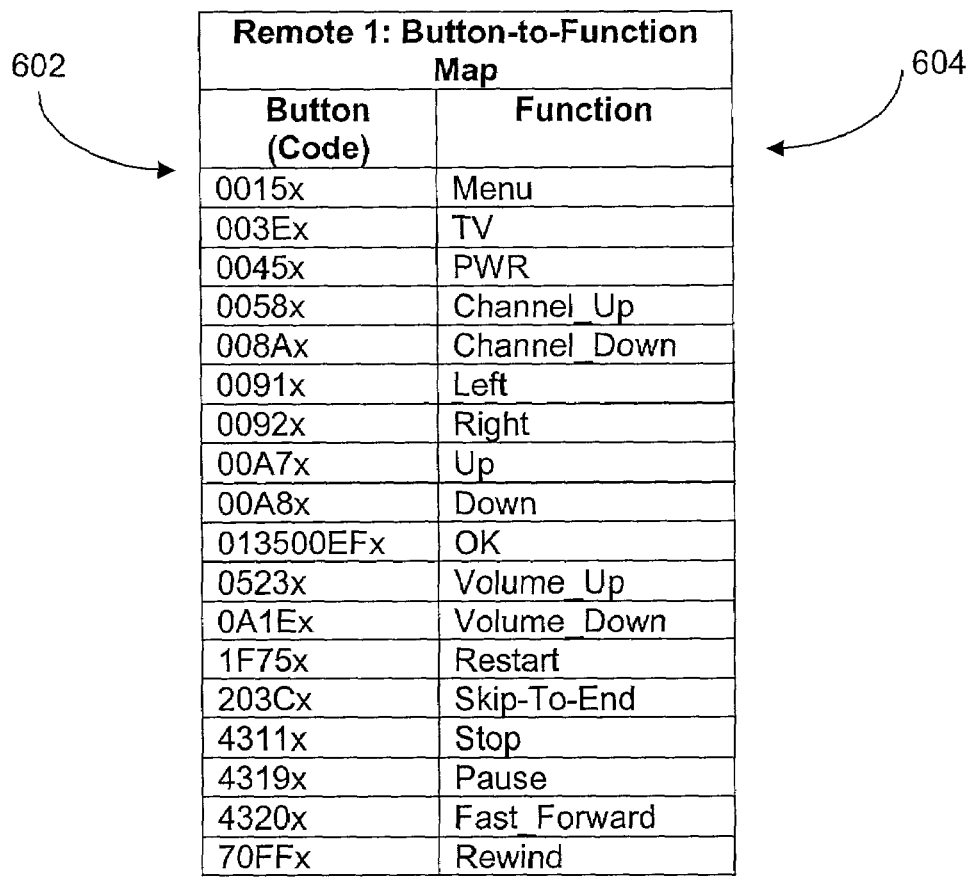
FIG. 6 illustrates a button-to-function map.

Referring now to FIG. 6, additional details are shown of a button-to-function map 502. While the map 502 is depicted as a table, those skilled in the art will recognize that many different data structures may be used. The left column 602 corresponds to codes generated on the corresponding remote control 106 in response to various buttons being pressed. In the depicted embodiment, the codes correspond to one or more 16 bit hexadecimal numbers. Of course, many different types of codes may be used within the scope of the invention. The right column 604 includes a listing of functions 402 (e.g., function names) associated with the corresponding button codes in the left column 602.

Figure 7:
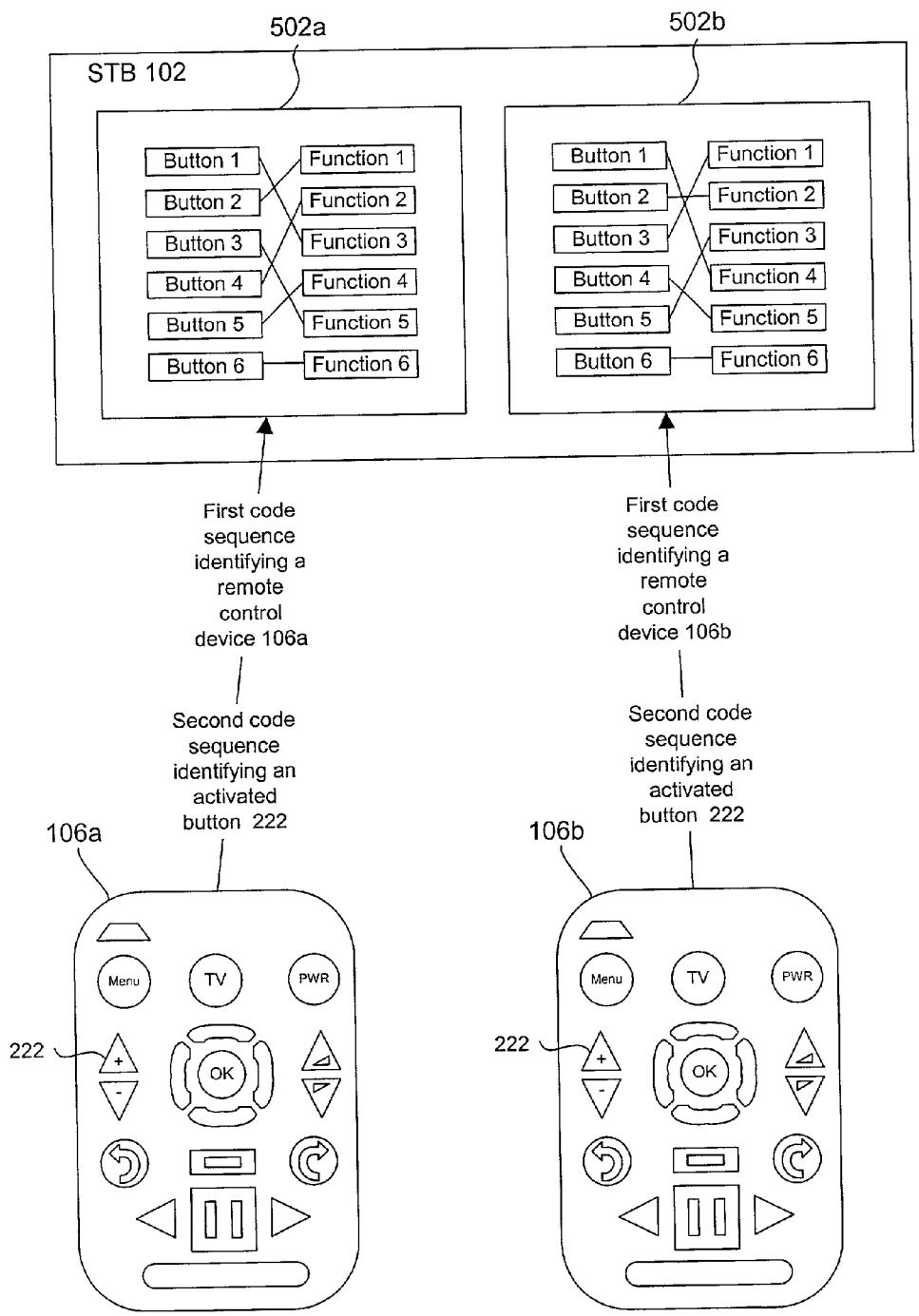
FIG. 7 is a dataflow diagram illustrating operation of a remote control with remote-specific button-to-function maps.

Referring now to FIG. 7, there is shown a dataflow diagram illustrating operation of two remote controls 106a–b with an STB 102 including two remote-specific button-to-function maps 502a–b. In one implementation, when a user presses a button on a remote control 106a or 106b, two code sequences are transmitted to the STB 102. Each code sequence may include one or more discrete codes in any suitable encoding format.

The first code sequence uniquely identifies the transmitting remote control 106, distinguishing the remote control 106 from other remote controls 106 associated with the STB 102. In one embodiment, the first code sequence is unique among all manufactured remotes, including, for example, a manufacturer's identification number, a model number, and a unique serial number. The second code sequence identifies the pressed button on the remote control 106.

The STB 102 uses the first code sequence to select the remote-specific button-to-function map 502 associated with the remote control 106. Thereafter, the STB 102 uses the second code sequence to select the function 402 within the map 502 to be executed by the STB 102.

In one configuration, when the STB 102 detects a unique first code sequence for the first time, the STB 102 may prompt a user to set up a new button-to-function map 502 or associate the first code sequence with a pre-existing button-to-function map 502. In this way, a replacement remote 106 (if an original remote control 106 is lost) may be associated with a pre-existing map 502. Also, button-to-function maps 502 may be shared over the network 101 to allow use of the same map 502 at different STBs 102 within a particular home or even at other homes or locations (e.g., a friend's home). As such, a user will not be required reprogram a button-to-function map 502 each time the remote 106 is used a different STB 102.

Figure 8:
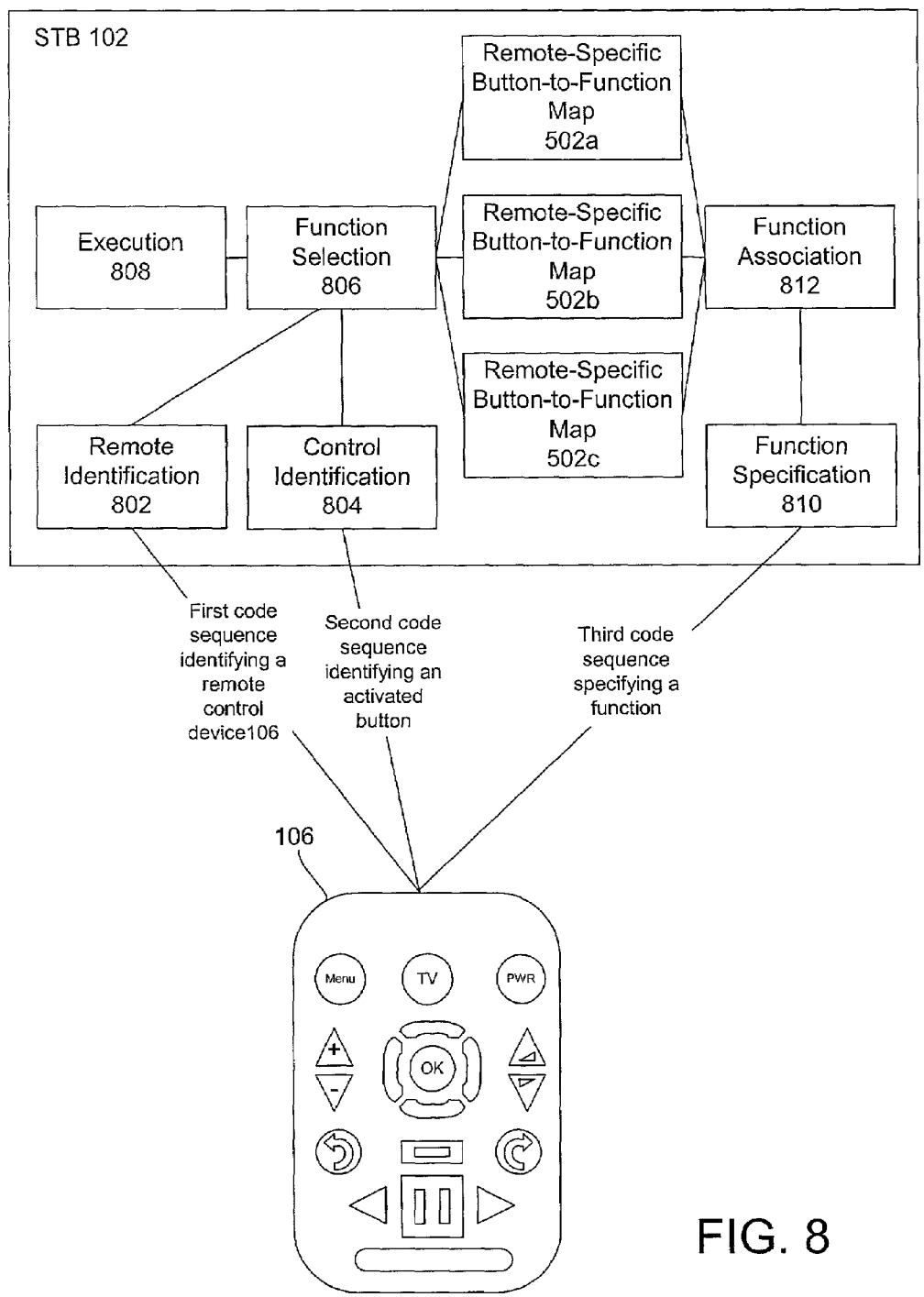
FIG. 8 is a block diagram of logical components of an STB having remote-specific button-to-function maps.

FIG. 8 is a block diagram of logical components of an STB 102 for enabling remote control personalization. The depicted logical components may be implemented using one or more of the physical components shown in FIG. 3. Additionally, or in the alternative, various logical components may be implemented as software modules stored in the memory 306 and/or storage device 310 and executed by the CPU 312. Those skilled in the art will recognize that various illustrated components may be combined together or integrated with standard components in various configurations without departing from the scope or spirit of the invention.

In one embodiment, a remote identification component 802 receives the first code sequence identifying the particular remote control 106 from a set of remote controls 106. A control identification component 804 may then receive a second code sequence identifying the activated button.

In response to receipt of the first and second code sequences, a function selection component 806 then selects a particular function 402 to be performed by the STB 102 based on the first and second code sequences. The function selection component 806 may perform this task, in one embodiment, by referencing a remote-specific button-to-function map 502 identified by the first code sequence and by referencing a function 402 indicated by the second code sequence within the referenced button-to-function map 502. Following selection of the function 402, an execution component 808 performs the selected function 402 within the STB 102.

As previously explained, a user may associate a button on a particular remote control 106 with a function to be performed by the STB 102. More specifically, a function specification component 810 may receive a third code sequence specifying a particular function 402 to be performed by the STB 102 upon activation of an indicated button.

The third code sequence may include a series of codes transmitted in response to a user navigating a displayed menu (not shown). For example, a user interface may display a map of a remote control 106 with each button having a corresponding number. The user interface may also include a list of numbers with drop-down menus for selecting a function 402 to be performed when the corresponding button is pressed. Of course, a variety of user interfaces may be provided for associating a button with a function 402.

In response to receipt of the third code sequence, a function association component 812 then associates the indicated button with the function indicated by the third code sequence. In one implementation, the function association component 812 alters the button-to-function map 502 associated with the identified remote control 106 accordingly.

Figure 9:
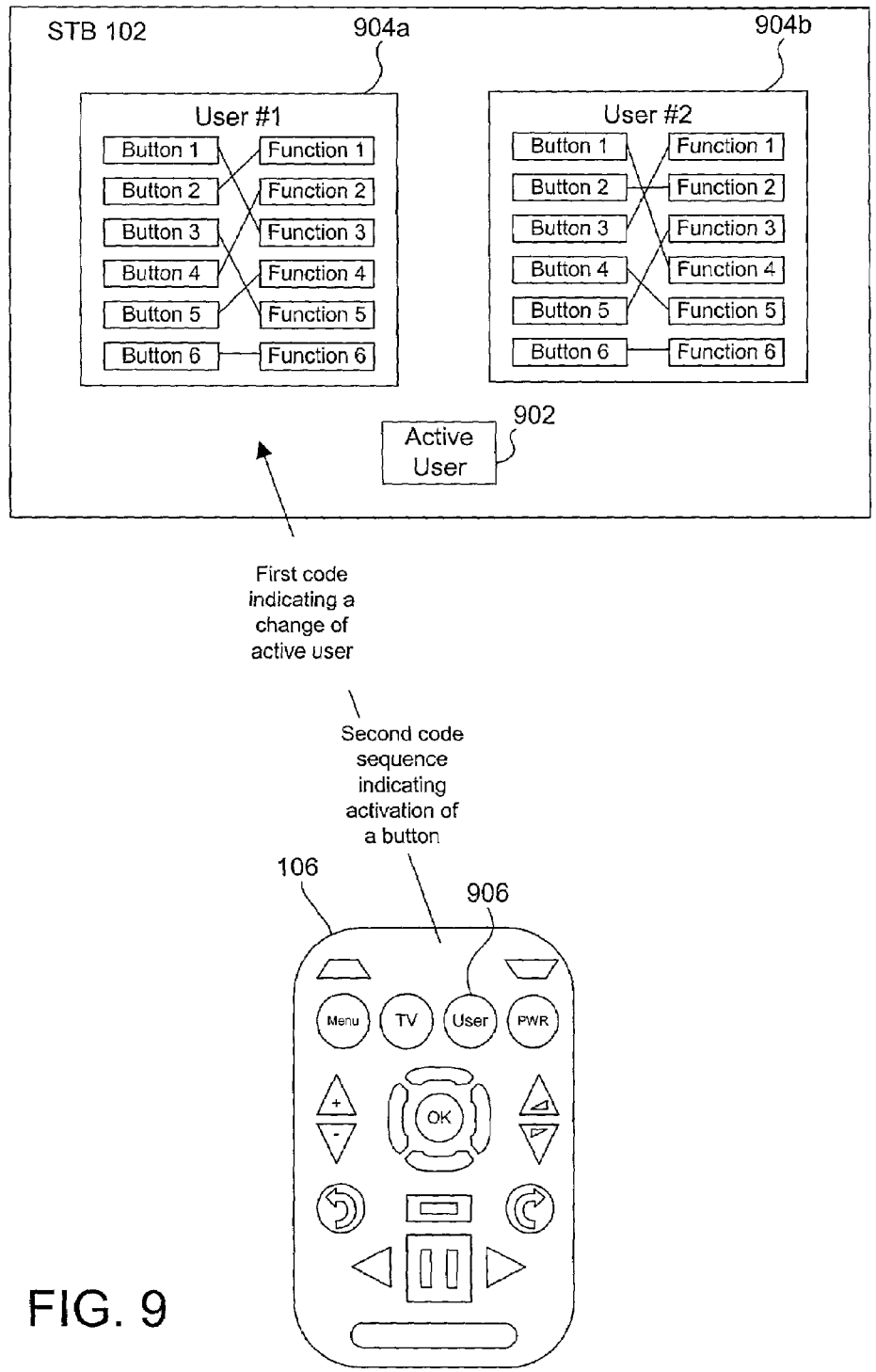
FIG. 9 is a dataflow diagram showing use of user-specific button-to-function maps with a remote control.

In an alternative embodiment of the invention, as shown in FIG. 9, an ITV system may only include a single remote control 106 (or a number of essentially identical remote controls 106). In such an embodiment, the STB 102 may store an indication of an active user 902 from a set of available users. Moreover, the STB 102 may store a separate, user-specific button-to-function map 904 for each available user.

In one implementation, the active user 902 may be changed in response to a first code sequence received from the remote control 106. As explained below, the first code sequence may involve a series of discrete codes for navigating a menu to select an active user 902 from a list of available users. Alternatively, the STB 102 may cycle through a list of available users in response to a specifically-designated "User" button 906 on the remote control 106 being pressed. In either case, a user-specific button-to-function map 904 may be selected. In one configuration, the first code sequence need not be transmitted until another change of active user 902 is desired.

A second code sequence is then transmitted, in one embodiment, by the remote control 106 to the STB 102 when a button is pressed. Thereafter, a function 402 is selected from the identified button-to-function map 904 based on the second code sequence. The STB 102 may then execute the function as previously described.

Figure 10:
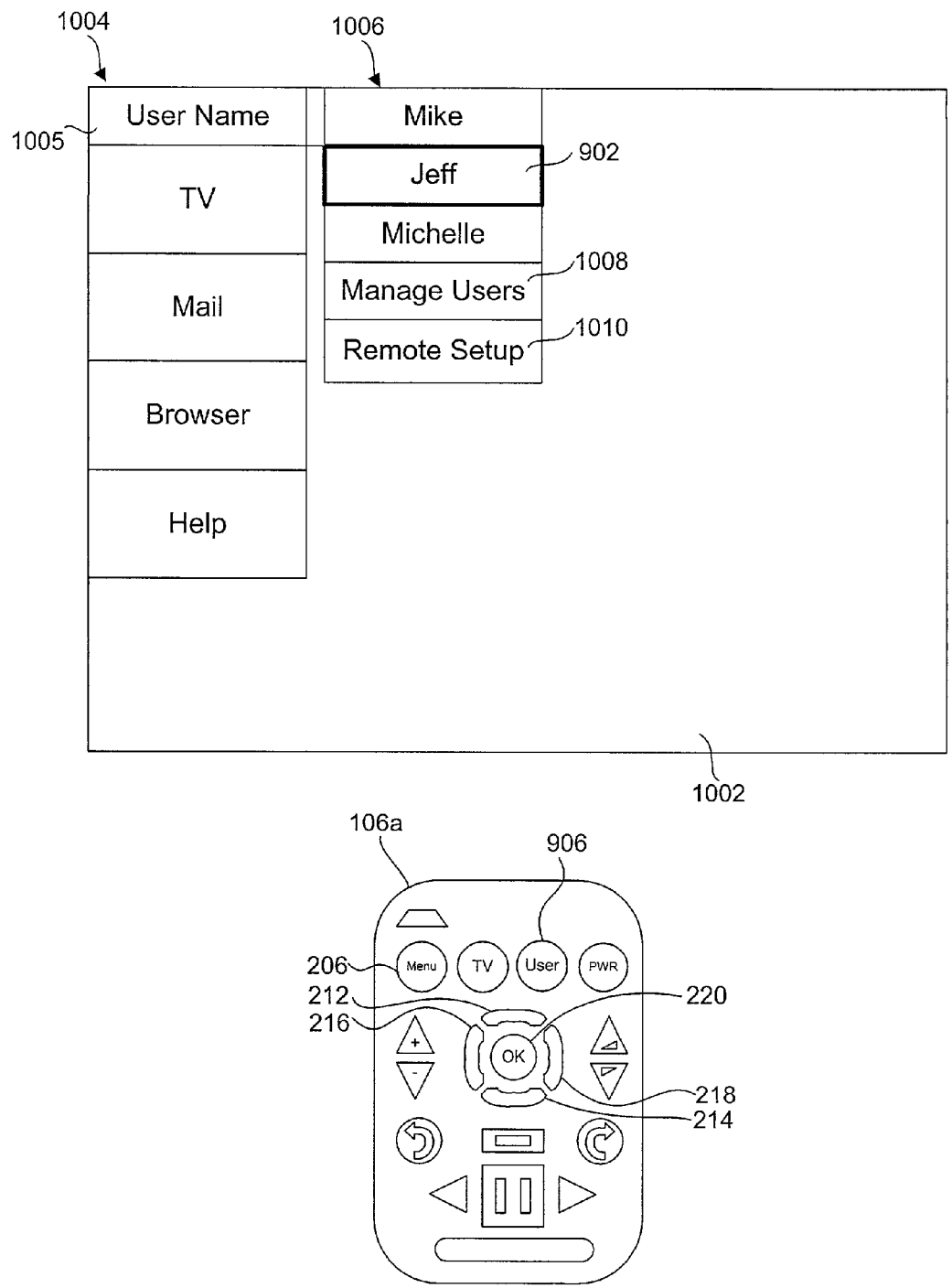
FIG. 10 illustrates an interface for changing an active user associated with an STB.

Referring now to FIG. 10, there is shown an exemplary interface 1002 for changing the active user 902 associated with an STB 102. The interface 1002 may include a menu 1004 that may be displayed on the television 104, in one embodiment, by activation of the "Menu" button 206 on the remote control 106.

A user may employ, for example, the arrow buttons 212, 214, 216, 218 and the "OK" button 220 on the remote control 106 to navigate and make selections within the menu 1004.

In one embodiment, by selecting the "User Name" option 1005 on the menu 1004, a submenu 1006 of users 902 is displayed. The user may then select any user shown on the submenu 1006 as the active user 902. The current active user 902 may be highlighted within the submenu 1006, in one configuration, using any suitable technique.

Alternatively, the submenu 1006 may be immediately displayed in response to the "User" button 906 being pressed. In one embodiment, each time the "User" button 906 is pressed, the active user 902 is changed to the next user listed in the submenu 1006. When the last user listed in the submenu 1006 is the active user 902, pressing the "User" button 906 may result in the first user in the submenu 1006 being selected as the active user 902.

In addition to a list of users, the submenu 1006 may include additional options, such as a "Manage Users" option 1008. In one embodiment, the "Manage Users" option 1008 allows a user to add, delete, or modify the users in the submenu 1006. Additionally, a "Remote Setup" option 1010 may be provided to allow a user to update the user's button-to-function map 904 to associate different functions with one or more buttons on the remote control 106.

Figure 11:
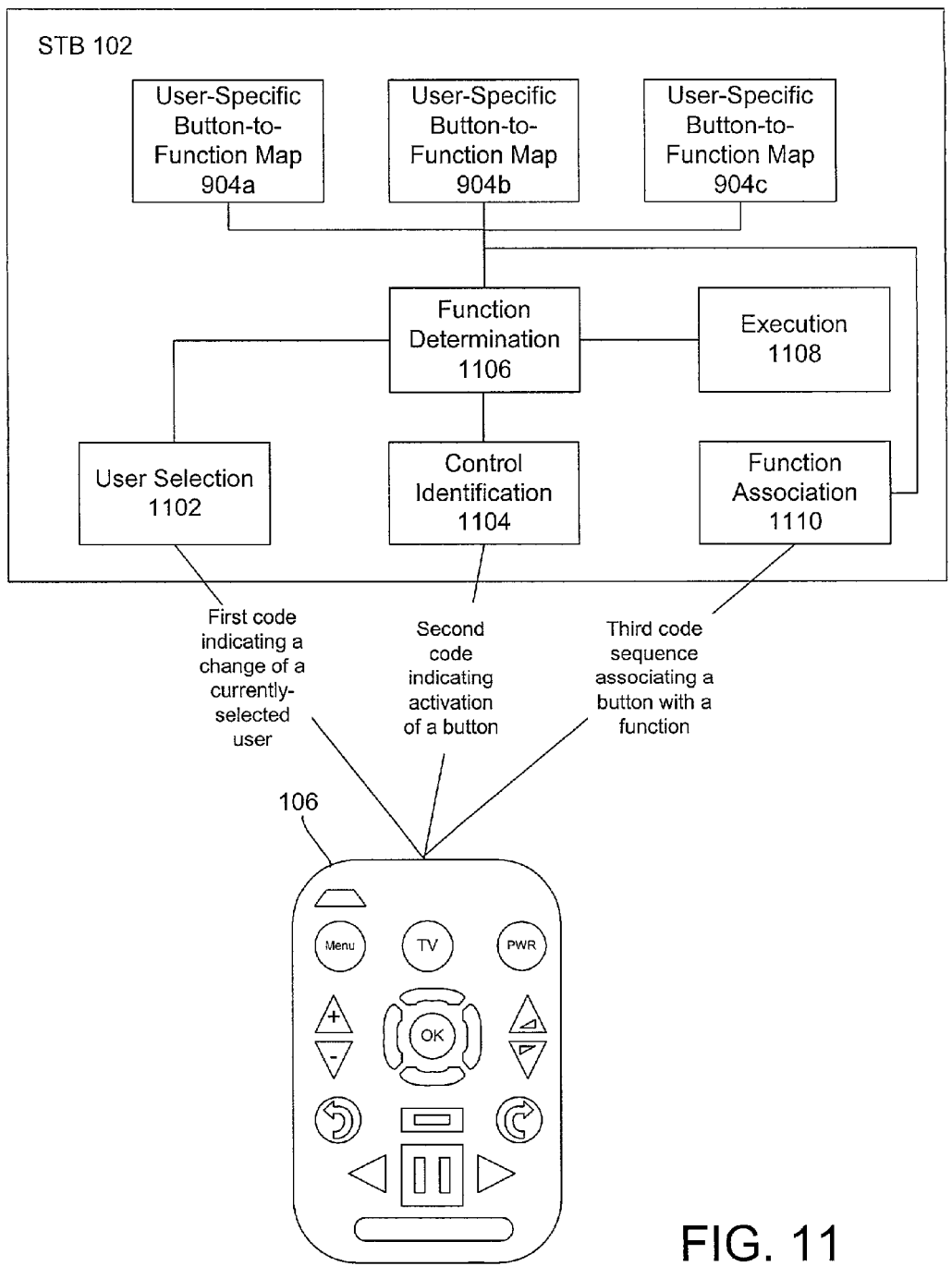
FIG. 11 is a block diagram of logical components of an STB having user-specific button-to-function maps.

FIG. 11 is a block diagram of logical components of an STB 102 having a plurality of user-specific button-to-function maps 904. As with FIG. 8, the depicted logical components may be implemented using one or more of the physical components shown in FIG. 3.

In one implementation, a user selection component 1102 receives a first code sequence indicating a change of an active user 902. The user selection component 1102 may also change the active user 902 in response to the first code sequence, resulting in a particular user-specific button-to-function map 904 being selected.

A control identification component 1104 may receive a second code sequence indicating activation of a button on a remote control 106. In response to receipt of the first and second code sequences, a function determination component 1106 may select a particular function to be performed by the ITV system 200 based on the active user (e.g., the selected button-to-function map 904) and the second code sequence. In one configuration, until the active user 902 is changed, each received code sequence will be processed by reference to the button-to-function map 904 associated with the current active user 902. Following selection of the function 402, an execution component 1108 performs the selected function 402 within the STB 102.

In one embodiment, a function association component 1110 may receive a third code sequence. The function association component 1110 may associate an indicated button on the remote device 106 with an available function to be performed for the active user 902 in response to activation of that button. In one implementation, the third code sequence may include a series of discrete codes (e.g., navigating a menu).

Figure 12:
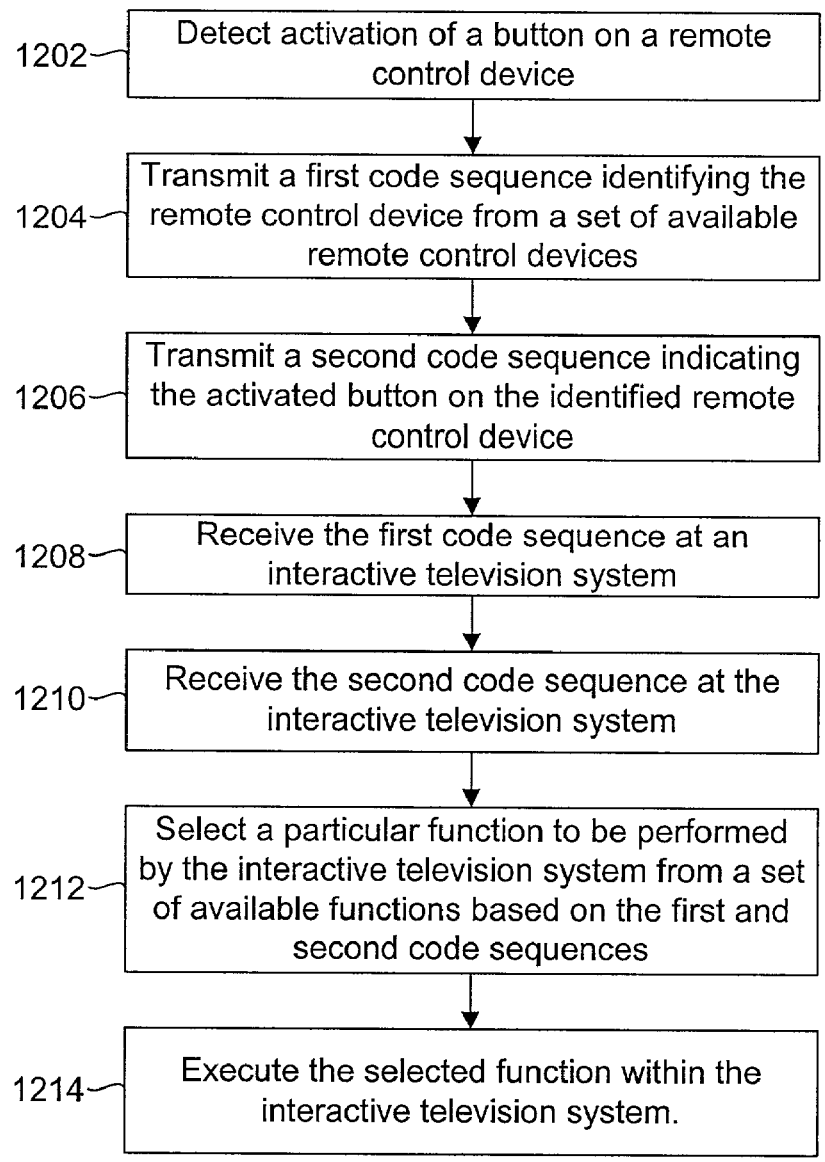
FIGS. 12 and 13 are flowcharts of methods for providing personalized remote control of an ITV system.

Referring now to FIG. 12, there is shown a flowchart of a method 1200 for personalized remote control of an ITV system 200 using remote-specific button-to-function maps 502. Activation of a button on a remote control 106 is detected 1202. In response thereto, a first code sequence identifying the remote control 106 is transmitted 1204. A second code sequence indicating the activated button on the identified remote control is also transmitted 1206.

The first and second code sequences are received 1208, 1210 at the ITV system 200. Based on the first and second code sequences, a particular function 402 to be performed by the ITV system 200 is selected 1212. The selected function 402 is then executed 1214 by the ITV system 200.

Figure 13:
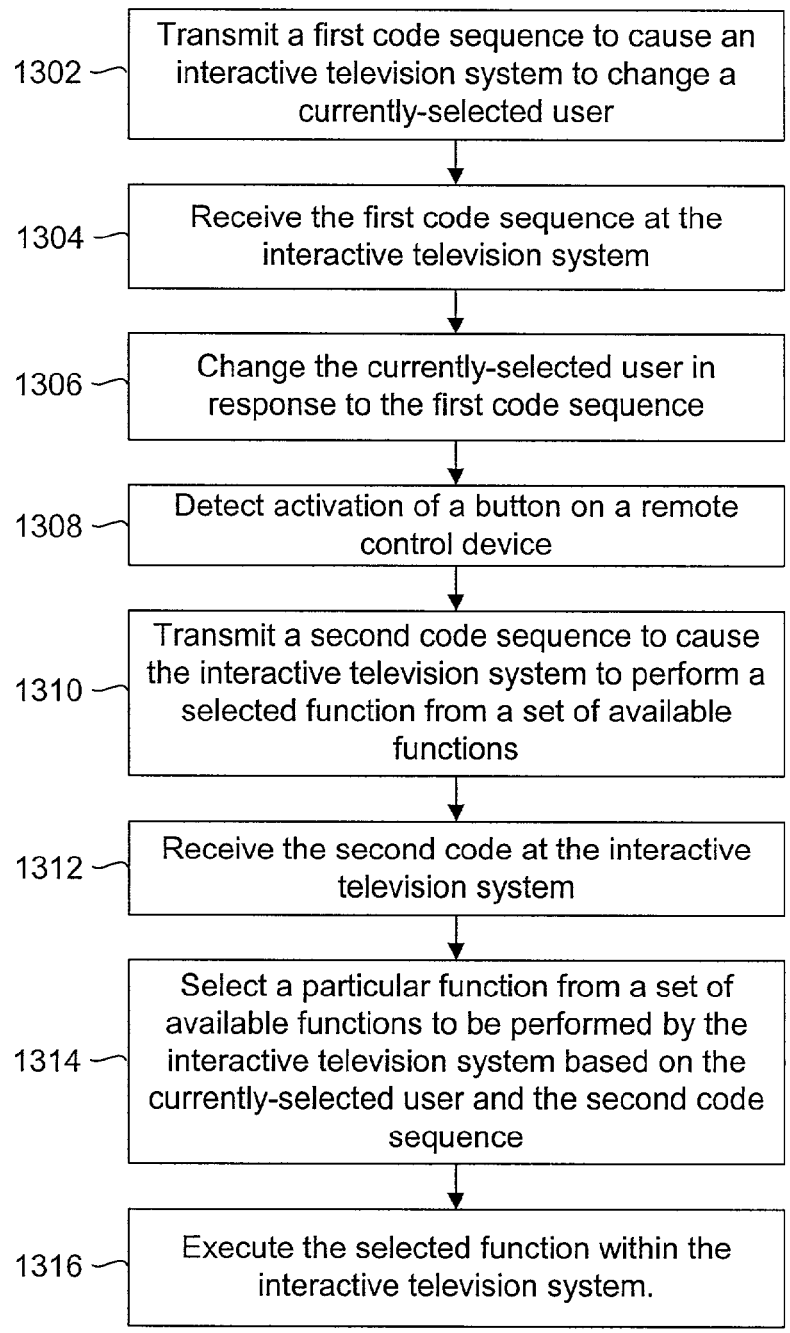

FIG. 13 is a flowchart illustrating a method 1300 for providing personalized remote control of an ITV system 200 using user-specific button-to-function maps 904. A first code sequence configured to cause an ITV system 200 to change an active user 902 is transmitted 1302 by a remote control 106. The first code sequence is received 1304 at the ITV system 200, and, in response thereto, the active user 902 is changed 1306.

Activation of a button on a remote control 106 is detected 1308. In response thereto, a second code sequence configured as to cause the ITV system 200 to perform a selected function 402 is transmitted 1310.

The second code is received 1312 at the ITV system 200. A particular function 402 to be performed by the ITV system 200 is selected 1314 in response to the activated button based on the active user 902 and the second code sequence. The selected function 402 is then executed 1316 by the ITV system 200.

Based on the foregoing, the present invention offers a number of advantages not available in conventional approaches. In particular, a user of an ITV system may have personalized control of an interactive television system through the use of a simplified remote control having a limited number of customizable buttons.

While specific embodiments and applications of the present invention have been illustrated and described, it is to be understood that the invention is not limited to the precise configuration and components disclosed herein. Various modifications, changes, and variations apparent to those skilled in the art may be made in the arrangement, operation, and details of the methods and systems of the present invention disclosed herein without departing from the spirit and scope of the invention.

What is claimed is:

1. A method for providing personalized remote control of an interactive television system, the method comprising:
    receiving a first code sequence identifying a particular remote control from a set of available remote controls;
    receiving a second code sequence indicating an activated control on the identified remote control;
    using the first code sequence to identify a particular control-to-function map from a plurality of control-to-function maps, each control-to-function map corresponding to a different remote control and associating code sequences with respective available functions within the interactive television system;
    using the second code sequence to select a corresponding one of the available functions from the identified control-to-function map;
    executing the selected function within the interactive television system; and
    sharing the identified control-to-function map over a network to allow a user to access another interactive television system with the identified remote control using the same control-to-function map.

2. The method of claim 1, wherein the first code sequence is unique to the identified remote control among all manufactured remote controls compatible with the interactive television system.

3. The method of claim 1, wherein the first and second code sequences are transmitted from the identified remote control to the interactive television system using infrared (IR) transmission.

4. The method of claim 1, wherein the first and second code sequences are transmitted from the identified remote control to the interactive television system using radio frequency (RF) transmission.

5. The method of claim 1, wherein each available function is capable of being performed by the interactive television system in response to activation of a control on a remote control.

6. The method of claim 5, wherein the identified remote control includes a set of buttons, and wherein the number of available functions is greater than the number of buttons on the identified remote control.

7. The method of claim 1, wherein the identified remote control includes a key chain attachment for coupling the remote control to a key chain.

8. A method for providing personalized remote control of an interactive television system, the method comprising:
    receiving a first code sequence identifying a particular remote control from a set of available remote controls;
    receiving a second code sequence indicating a control on the identified remote control;
    receiving a third code sequence specifying a particular user-selected function from a set of available functions capable of being performed by the interactive television system in response to activation of the indicated control, wherein the interactive television system includes a set of remote-specific control-to-function maps, each control-to-function map corresponding to one of the available remote controls, each control-to-function map associating a code sequence with one of the available functions;
    identifying a particular control-to-function map from the set of control-to-function maps based on the first code sequence;
    associating the second bode sequence with the specified function within the identified control-to-function map; and
    sharing the identified control-to-function map over a network to allow a user to access another interactive television system with the identified remote control using the same control-to-function map.

9. A method for providing personalized remote control of an interactive television system, the method comprising:
    detecting activation of a control on a remote control;
    transmitting a first code sequence identifying the remote control from a set of available remote controls for the interactive television system;
    using the first code sequence to identify a particular control-to-function map from a plurality of control-to-function maps, each control-to-function map corresponding to a different remote control and associating code sequences with respective available functions within the interactive television system, wherein the identified control-to-function map is shared over a network to allow a user to access the interactive television system with the identified remote control using the same control-to-function map as a user on another interactive television system; and
    transmitting a second code sequence indicating the activated control on the identified remote control, wherein the second code sequence is used to select a corresponding one of the available functions from the identified control-to-function map to be performed by the interactive television system.

10. The method of claim 9, further comprising:
    transmitting a third code sequence to associate a control on the identified remote control with a particular user-selected function from the available functions to be performed by the interactive television system in response to activation of the control.

11. The method of claim 9, wherein the first code sequence is unique to the identified remote control among all manufactured remote controls compatible with the interactive television system.

12. The method of claim 9, wherein the first and second code sequences are transmitted from the identified remote control to the interactive television system using infrared (IR) transmission.

13. The method of claim 9, wherein the first and second code sequences are transmitted from the identified remote control to the interactive television system using radio frequency (RF) transmission.

14. The method of claim 9, wherein each available function is capable of being performed in response to activation of a control on a remote control.

15. The method of claim 14, wherein the identified remote control includes a set of controls, and wherein the number of available functions is greater than the number of controls on the identified remote control.

16. The method of claim 9, wherein the identified remote control includes a key chain attachment for coupling the remote control to a key chain.

17. The method of claim 9, further comprising:
transmitting a third code sequence configured to open a garage door.

18. The method of claim 9, further comprising:
transmitting a third code sequence configured to unlock an automobile door.

19. An interactive television system providing personalized remote control, the system comprising:
a remote identification component that receives a first code sequence identifying a particular remote control from a set of available remote controls and uses the first code sequence to identify a particular control-to-function map from a plurality of control-to-function maps, each control-to-function map corresponding to a different remote control and associating code sequences with respective available functions within the interactive television system, wherein the identified control-to-function map is retrieved through a network to allow a user to access the interactive television system with the identified remote control using the same control-to-function map as a user on a different interactive television system;
a control identification component that receives a second code sequence indicating an activated control on the identified remote control;
a function selection component that uses the second code sequence to select a corresponding one of the available functions from the identified control-to-function map; and
an execution component that performs the selected function within the interactive television system.

20. The interactive television system of claim 19, wherein the first code sequence is unique to the identified remote control among all manufactured remote controls compatible with the interactive television system.

21. The interactive television system of claim 19, wherein the first and second code sequences are transmitted from the identified remote control to the interactive television system using infrared (IR) transmission.

22. The interactive television system of claim 19, wherein the first and second code sequences are transmitted from the identified remote control to the interactive television system using radio frequency (RF) transmission.

23. The interactive television system of claim 19, wherein each available function is capable of being performed by, the interactive television system in response to activation of a control on a remote control.

24. The interactive television system of claim 23, wherein the identified remote control includes a set of controls, and wherein the set of available functions is greater in number than the set of controls on the identified remote control.

25. The interactive television system of claim 19, wherein the identified remote control includes a key chain attachment for coupling the remote control to a key chain.

26. An interactive television system providing personalized remote control, the system comprising:
a remote identification component that receives a first code sequence identifying a particular remote control from a set of available remote controls;
a control identification component that receives a second code sequence indicating a control on the identified remote control;
a function specification component that receives a third code sequence specifying a particular user-selected function from a set of available functions capable of being performed by the interactive television system in response to activation of the indicated control, wherein the interactive television system includes a set of remote-specific control-to-function maps, each control-to-function map corresponding to one of the available remote controls, each control-to-function map associating a code sequence with one of the available functions;
a function association component that associates the indicated control on the identified remote control with the specified function to be performed in response to activation of the control, wherein the function association component is configured to identify a particular control-to-function map from the set of control-to-function maps based on the first code sequence and to associate the second code sequence with the specified function within the identified control-to-function map; and
a network interface that shares the identified control-to-function map over a network to allow a user to access another interactive television system with the identified remote control using the same control-to-function map.

27. A personalized remote control for an interactive television system, the remote control comprising:
at least one control; and
a transmitter, coupled to the control, configured to transmit a first code sequence identifying the remote control from a set of available remote controls for the interactive television system,
wherein the transmitter is further configured to transmit a second code sequence indicating the activated control on the identified remote control, wherein the first code sequence is used to identify a particular control-to-function map from a plurality of control-to-function maps, each control-to-function map corresponding to a different remote control and associating code sequences with respective available functions within the interactive television system, and wherein the second code sequence is used to select a corresponding one of the available functions from the identified control-to-function map for execution by the interactive television system, wherein the identified control-to-function map is retrieved through a network to allow a user to access the interactive television system with the remote control using the same control-to-function map as users on one or more different interactive television systems.

28. The remote control of claim 27, wherein the transmitter is further configured to transmit a third code sequence for associating a control on the identified remote control with a particular user-selected function from the available functions to be performed by the interactive television system in response to activation of the control.

29. The remote control of claim 27, wherein the first code sequence is unique to the identified remote control.

30. The remote control of claim 27, wherein the first and second code sequences are transmitted from the identified remote control to the interactive television system using infrared (IR) transmission.

31. The remote control of claim 27, wherein the first and second code sequences are transmitted from the identified remote control to the interactive television system using radio frequency (RF) transmission.

32. The remote control of claim 27, wherein each available function is capable of being performed in response to activation of a control on a remote control.

33. The remote control of claim 32, wherein the identified remote control includes a set of controls, and wherein the number of available functions is greater than the number of controls on the identified remote control.

34. The remote control of claim 27, wherein the identified remote control includes a key chain attachment for coupling the remote control to a key chain.

35. The remote control of claim 27, wherein the transmitter is further configured to transmit a third code sequence configured to open a garage door.

36. The remote control of claim 27, wherein the transmitter is further configured to transmit a third code sequence configured to unlock an automobile door.

37. A method for providing personalized remote control of an interactive television system, the method comprising:
    detecting activation of a control on a remote control;
    transmitting a first code sequence to a set top box distinguishing the remote control from a set of available remote controls;
    selecting a remote-specific control-to-function map within the set top box based on the first code sequence, wherein the selected control-to-function map is retrieved through a network to allow a user to access the interactive television system with the remote control using the same control-to-function map as users on one or more different interactive television systems;
    transmitting a second code sequence to the set top box indicating the activated control;
    selecting a function to be performed by the set top box from a set of available functions within the selected remote-specific control-to-function map based on the second code sequence; and
    executing the selected function within the set top box.

38. A system for providing personalized remote control of an interactive television system, the system comprising:
    a control detection component that detects activation of a control on a remote control;
    a remote identification component that transmits a first code sequence to a set top box distinguishing the remote control from a set of available remote controls;
    a map selection component that selects a remote-specific control-to-function map within the set top box based on the first code sequence, wherein the selected control-to-function map is accessed through a network to allow a user to control the interactive television system with the remote control using the same control-to-function map as users on one or more different interactive television systems;
    a control identification component that transmits a second code sequence to the set top box indicating the activated control;
    a function selection component that selects a function to be performed by the set top box from a set of available functions within the selected remote-specific control-to-function map based on the second code sequence; and
    an execution component that performs the selected function within the set top box.

39. A personalized remote control for an interactive television system, comprising:
    means for detecting activation of a control on a remote control;
    means for transmitting a first code sequence identifying the remote control from a set of available remote controls for the interactive television system;
    means for using the first code sequence to identify a particular control-to-function map from a plurality of control-to-function maps, each control-to-function map corresponding to a different remote control and associating code sequences with respective available functions within the interactive television system, wherein the identified control-to-function map is accessed through a network to allow a user to control the interactive television system with the particular remote control using the same control-to-function map as users on one or more different interactive television systems; and
    means for transmitting a second code sequence indicating the activated control on the identified remote control, wherein the second code sequence is used to select a corresponding one of the available functions from the identified control-to-function map to be performed by the interactive television system.

40. An interactive television system providing personalized remote control, comprising:
    means for receiving a first code sequence identifying a particular remote control from a set of available remote controls;
    means for receiving a second code sequence indicating an activated control on the identified remote control;
    means for using the first code sequence to identify a particular control-to-function map from a plurality of control-to-function maps, each control-to-function map corresponding to a different remote control and associating code sequences with respective available functions within the interactive television system, wherein the identified control-to-function map is accessed through a network to allow a user to control the interactive television system with the particular remote control using the same control-to-function map as one or more users on one or more different interactive television systems;
    means for using the second code sequence to select a corresponding one of the available functions from the identified control-to-function map; and
    means for executing the selected function within the interactive television system.

41. A interactive television system for providing personalized remote control, comprising:
    means for receiving a first code sequence identifying a particular remote control from a set of available remote controls;
    means for receiving a second code sequence indicating a control on the identified remote control;
    means for receiving a third code sequence specifying a particular user-selected function from a set of available functions capable of being performed by the interactive television system in response to activation of the indicated control, wherein the identified remote control includes a set of controls, wherein the number available functions is greater than the number of controls on the identified remote control, and wherein each function is assignable to each control on the identified remote control, wherein the identified control-to-function map is accessed through a network to allow a user to control the interactive television system with the particular remote control using the same control-to-function map as one or more users on one or more different interactive television systems; and means for associating the indicated control on the identified remote control with the specified function to be performed in response to activation of the control.

42. The method of claim 1, further comprising sharing the identified control-to-function map over a network to allow a user to access another interactive television system with the identified remote control using the same control-to-function map.

43. The method of claim 8, wherein receiving a first code sequence further comprises:

determining that no control-to-function map exists for the first code sequence when the particular first code sequence is received for the first time; and prompting a user to set up a control-to-function map for the identified remote control.

44. The method of claim 1, further comprising:

allowing a user to associate the first code sequence with a preexisting code-to-function map.

* * * * *